US011634946B2

(12) United States Patent
Liarno et al.

(10) Patent No.: US 11,634,946 B2
(45) Date of Patent: Apr. 25, 2023

(54) SELECTION OF AN OPTIMAL LIFT ASSIST MECHANISM

(71) Applicant: Mechoshade Systems, LLC, Middleton, WI (US)

(72) Inventors: Xi Ming Liarno, Bergenfield, NJ (US); Joel Berman, Hewlett, NY (US); Stephen Hebeisen, Amawalk, NY (US); Eugene Miroshnichenko, Oceanside, NY (US)

(73) Assignee: MECHOSHADE SYSTEMS, LLC, Middleton, WI (US)

( * ) Notice: Subject to any disclaimer, the term of this patent is extended or adjusted under 35 U.S.C. 154(b) by 0 days.

(21) Appl. No.: 17/705,992

(22) Filed: Mar. 28, 2022

(65) Prior Publication Data

US 2022/0220804 A1    Jul. 14, 2022

Related U.S. Application Data

(63) Continuation of application No. 16/285,555, filed on Feb. 26, 2019, now Pat. No. 11,326,396.

(51) Int. Cl.
*E06B 9/60*  (2006.01)
*G06N 5/00*  (2023.01)
(Continued)

(52) U.S. Cl.
CPC ........... *E06B 9/60* (2013.01); *G06N 5/00* (2013.01); *E06B 9/44* (2013.01); *E06B 9/50* (2013.01);
(Continued)

(58) Field of Classification Search
CPC ..... E06B 9/60; E06B 9/50; E06B 9/44; E06B 9/62; E06B 9/42; E06B 9/72; E06B 9/90;
(Continued)

(56) References Cited

U.S. PATENT DOCUMENTS 6,003,584 A      12/1999  Weinreich
10,538,965 B1 *   1/2020  Nguyen ............... F21V 33/006
(Continued)

FOREIGN PATENT DOCUMENTS

| JP | H09273368 | 10/1997 |
| WO | 2008063566 | 5/2008 |
| WO | 2012051404 | 4/2012 |

OTHER PUBLICATIONS

UKIPO; UK Examination Report dated Jul. 22, 2021 in Application No. GB2001630.9.
(Continued)

*Primary Examiner* — Mouloucoulaye Inoussa
(74) *Attorney, Agent, or Firm* — Snell & Wilmer L.L.P.

(57) ABSTRACT

A desired range of lift force to raise a window shade is used to select the window shade hardware such as, for example, the optimal LAM. A desired lift force may be 5 pounds for ADA compliance. However, if the user wants to exert less effort to lift the window shade, the user may request an increased lift force of 6 or 7 pounds. Therefore, if a lift force range between 3-8.5 pounds is desired, the system selects the optimal LAM to maintain and guarantee that the lift force required to operate the shades will not exceed the desired range of between 3-8.5 pounds.

20 Claims, 3 Drawing Sheets (51) Int. Cl.
*E06B 9/68* (2006.01)
*E06B 9/44* (2006.01)
*E06B 9/50* (2006.01)

(52) U.S. Cl.
CPC ............... *E06B 2009/6809* (2013.01); *E06B 2009/6854* (2013.01)

(58) Field of Classification Search
CPC ..... E06B 9/84; E06B 9/78; E06B 9/68; E06B 9/32; G06N 5/00; H02J 50/27; H02J 7/35; H02J 50/10; H02J 7/02; G03B 21/56; H04L 12/10; H04B 10/807; G05B 11/00; G06T 7/0002; G06T 7/73; G06T 7/97; G06V 10/06; Y02B 80/00; Y02A 30/24
See application file for complete search history.

(56) References Cited

U.S. PATENT DOCUMENTS

| | | | | |
|---|---|---|---|---|
| 2008/0258666 A1* | 10/2008 | Carmen | .................... | E06B 9/68 318/470 |
| 2012/0053731 A1* | 3/2012 | Feldstein | .................. | E06B 9/70 160/311 |
| 2013/0264976 A1* | 10/2013 | Lucas | ....................... | E06B 9/42 318/255 |
| 2014/0090787 A1* | 4/2014 | Colson | ...................... | E06B 9/68 160/7 |
| 2014/0277810 A1* | 9/2014 | Costa | ...................... | G06F 1/263 700/297 |
| 2014/0338844 A1* | 11/2014 | Diederiks | ................. | E06B 9/68 160/5 |
| 2014/0360685 A1* | 12/2014 | Bohlen | ..................... | E06B 9/74 160/313 |
| 2015/0136337 A1* | 5/2015 | Fraczek | .................... | E06B 9/78 192/223.4 |
| 2015/0160626 A1* | 6/2015 | Cregg | ....................... | E06B 9/24 700/275 |
| 2016/0222711 A1* | 8/2016 | Aoshima | ................. | E05F 15/41 |
| 2017/0067289 A1* | 3/2017 | Campagna | ................ | E06B 9/72 |
| 2017/0218703 A1* | 8/2017 | Wei | ......................... | F16H 29/12 |
| 2018/0119488 A1* | 5/2018 | Lundy | ....................... | E06B 9/68 |
| 2018/0202224 A1* | 7/2018 | Kumar | ...................... | E06B 9/42 |
| 2018/0216404 A1* | 8/2018 | Fisher | ....................... | E06B 9/90 |
| 2019/0032403 A1* | 1/2019 | Chen | ......................... | E06B 9/322 |
| 2019/0218859 A1* | 7/2019 | Campagna | ............... | E06B 9/90 |
| 2019/0345761 A1* | 11/2019 | Hsu | ............................ | E06B 9/44 |
| 2019/0384232 A1* | 12/2019 | Casey | ........................ | G06T 7/97 |
| 2020/0018118 A1* | 1/2020 | Geiger | ...................... | A47H 1/13 |
| 2020/0185965 A1* | 6/2020 | Poirier | .................... | G03B 21/56 |
| 2020/0263494 A1* | 8/2020 | Hebeisen | ................. | E06B 9/72 |
| 2021/0363820 A1* | 11/2021 | Friman | ..................... | E06B 9/62 |

OTHER PUBLICATIONS

UKIPO; UK Combined Search and Examination Report dated Jul. 28, 2020 in Application No. GB2001630.9.
UKIPO; UK Examination Report dated Jan. 11, 2022 in Application No. GB2001630.9.
USPTO, Non-Final Office Action dated Feb. 8, 2022 in U.S. Appl. No. 16/285,555.
USPTO, Notice of Allowance dated Mar. 25, 2022 in U.S. Appl. No. 16/285,555.
CINPA, Chinese First Office Action dated Feb. 15, 2023 in Application No. 202010113448..X.

\* cited by examiner

SELECTION OF AN OPTIMAL LIFT ASSIST MECHANISM

CROSS-REFERENCE TO RELATED APPLICATIONS

This application is a continuation of, claims priority to and the benefit of, U.S. Ser. No. 16/285,555 filed Feb. 26, 2019 and entitled "LIFT FORCE DETERMINING AN OPTIMAL LIFT ASSIST MECHANISM," which is hereby incorporated by reference in its entirety for all purposes.

FILED

The disclosure generally relates to a configurator, and more specifically, to systems and methods for a range of lift force determining an optimal lift assist mechanism for a window shade.

BACKGROUND

Figure 1:
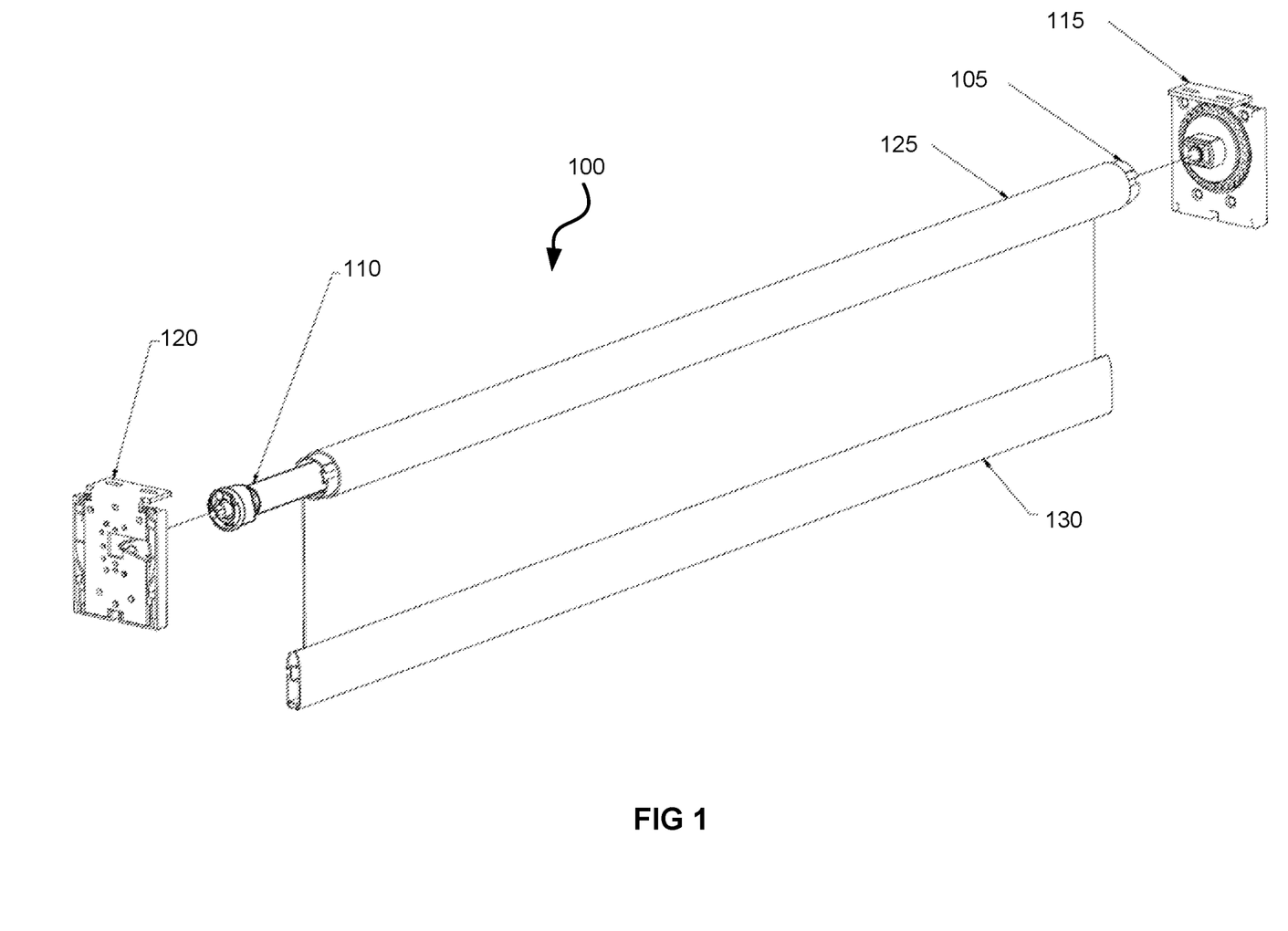
FIG. 1 illustrates a LAM within a window shade system, in accordance with various embodiments.
Figure 2:
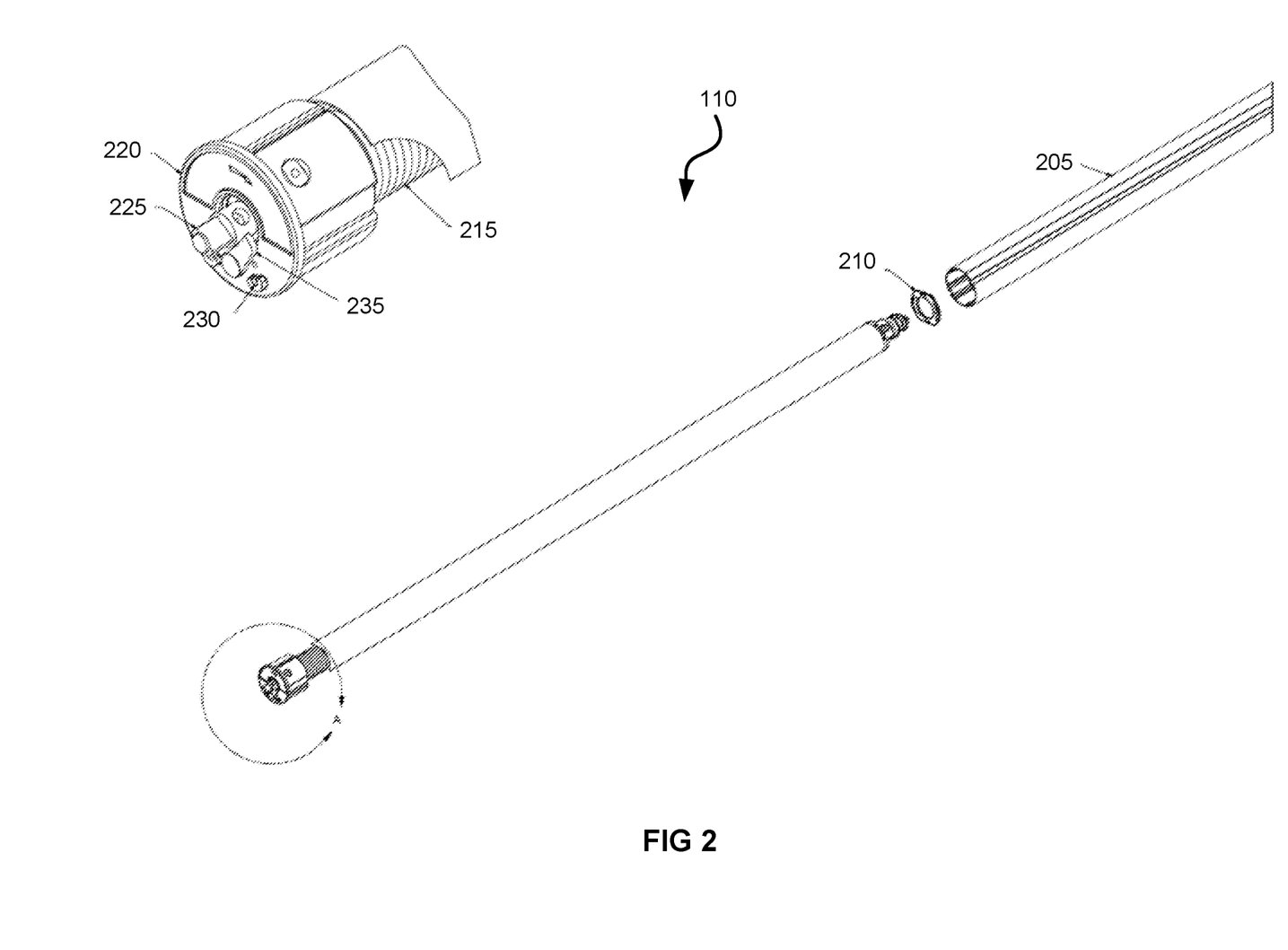
FIG. 2 illustrates a LAM and its components, in accordance with various embodiments.

A window shade system often uses different springs to create a lift assist mechanism (known as a "LAM"). FIG. 1 shows an exemplary LAM within a window shade system and FIG. 2 shows the components an exemplary LAM. When the window shade is lowered, the spring in the LAM is wound up, so it stores potential energy. When the shade is raised, the LAM releases potential energy to assist with the lifting. As such, the LAM helps to reduce the pull force required on the chain to rotate the shade tube and lift the window shade. The chain rotates the shade tube and the shade tube causes the window shade to rise in response to the window shade being rolled up onto the shade tube. The appropriate LAM should also avoid having too easy of a pull force. A minimum force threshold may be needed because, if a shade is too easy to lift, then the user may pull strong enough to generate great speed momentum which can cause damage as the hembar hits the top limit.

Moreover, such shade systems often include different shade sizes, shade fabrics, tube sizes, multi-banding options, channels, and other configurations. Regardless of the type of shade system and its components, the lift force needed to pull the chain should be maintained around 3-8.5 pounds. For ADA compliance, the lift force needed to pull the chain should not surpass a 5 pound lift force limit. However, it is difficult for a custom shade manufacturer to determine the appropriate LAM for a particular custom shade system that will result in a particular lift force or a lift force range.

The LAM may also interact with a wrap spring clutch. Many variations of wrap spring clutch systems for the operation of window shades have been developed and are familiar to those skilled in the art. These clutch systems typically employ a fixed cylindrical core shaft or stud about which a helical coil spring is positioned, a rotary drive member capable of controlling the inner diameter of the coil spring, and a bushing adapted to ensure engagement of the shaft, spring, and rotary members. During operation of the typical wrap spring system, the rotation of the rotary drive member increases the inner diameter of the wrap spring, which reduces the friction between the core shaft and wrap spring, thereby allowing the lowering or raising of the window shade as desired. However, a large amount of force may be required when pulling the chain, in order to rotate the rotary drive member and increase the diameter of the spring.

U.S. Pat. Nos. 4,779,662 and 6,164,428 are examples of a window shade wrap spring clutch system, and are incorporated by reference in their entirety for all purposes. The Wilk patent discloses a stationary stud upon which is wound a wrap spring, wherein the wrap spring normally hugs or binds against the stud. A drive member in the form of a pulley is positioned around the stud and wrap spring, such that, once the pulley is rotated, the pulley inner bore can be placed in contact with one radially-extended tang of the wrap spring. A "tang" is the end of the wrap spring extending radially from the circumference of the spring. During operation, the pulley is rotated manually by means of a chain. The manual rotation of the pulley causes the pulley inner bore to contact a first wrap spring tang. Continued rotation of the pulley separates the spring tangs, thereby enlarging the effective inside diameter of the spring, allowing the spring to slip and rotate about the core shaft. The portion of the wrap spring opposite the contacted tang slides along the core shaft member creating a friction drag, which serves to stabilize the raising and lowering of the window shade during operation. However, a large amount of force may be required when pulling the chain to rotate the pulley and separate the tangs. As such, a LAM may be incorporated into the window shade system to interact with the wrap spring clutch and reduce the force needed to pull on the chain.

SUMMARY

Systems, methods, and articles of manufacture (collectively, the "system") for determining the optimal lift assist mechanism for a window shade system are disclosed. In various embodiments, the system uses a desired range of lift force to raise a window shade to select an optimal lift assist mechanism (LAM). The system may be configured for determining, by a computer based system, that a window shade with a first shade tube is below a deflection limit and a weight limit; determining, by the computer based system, a hanging weight for the window shade at multiple locations; determining, by the computer based system, a RUD for the window shade at the multiple locations; determining, by the computer based system, a number of turns for the window shade at the multiple locations; determining, by the computer based system, a pull force for the window shade at the multiple locations based on the hanging weight, the RUD and the number of turns; determining, by the computer based system, a maximum pull force based on the maximum of the pull forces at the multiple locations; selecting, by the computer based system, a first LAM in response to the maximum pull force being greater than a pull threshold; determining, by the computer based system, that the first LAM is compatible with a first shade tube; determining, by the computer based system, that the number of turns is above a turn threshold for the window shade at 100% down of the multiple locations; determining, by the computer based system, pull forces for the first LAM at the multiple locations; determining, by the computer based system, that the pull forces for the first LAM are within a pull force range at each of the multiple locations; and suggesting, by the computer based system, the first LAM for use with the window shade.

In various embodiments, the system may further be configured for determining, by the computer based system, a LAM that provides a maximum force threshold and/or a minimum force threshold. The system may also be configured for analyzing, by the computer based system, at least one of a shade size, shade fabric, size of the first shade tube, multi-banding option, fabric weight, hembar weight, channel or configuration for a window shading system. The system may also be configured for substituting, by the computer based system, a second shade tube for the first shade tube, in response to the window shade with the first shade tube being above a deflection limit and a weight limit.

The multiple locations may include a first location, a second location and a third location. The multiple locations may include 35% down, 75% down and 100% down. The threshold may be 9.6 pounds.

The system may also be configured for suggesting, by the computer based system, no LAM in response to the maximum pull force being less than the pull threshold. Being compatible with the first shade tube may include the first LAM fitting inside the first shade tube. The system may also be configured for selecting, by the computer based system, a second shade tube, in response to the first LAM not being compatible with the first shade tube. The system may also be configured for determining, by the computer based system, a second maximum pull force for a second shade tube, in response to the first LAM not being compatible with the first shade tube. The system may also be configured for suggesting, by the computer based system, a second LAM, in response to the determining that the pull forces for the first LAM are outside of a pull force range at any of the multiple locations.

Determining the pull forces for the first LAM may include subtracting the torque of the spring at the multiple locations to find the worst case from the torque of the window shade. Determining the pull force for the first LAM may include considering the RUD and the number of turns. Determining the pull force for the first LAM may include the RUD and the number of turns at a 75% down and a 100% down locations of the multiple locations. The pull force range may be between about 8.6 pounds and about 5.5 pounds.

For shades of many sizes (large and small) the lift force range may be maintained up to a predetermined maximum shade weight. The system may allow for a configuration of different ranges of lift for different ranges of shades being offered. This may include considering various weights and friction as may occur in single or multi-band window shades. The range of minimum lift force and maximum lift force may be determined by the manufacturer or the buyer/end user.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

As set forth in FIG. 1, in various embodiments, a window shade system 100 may include a shade tube 105, a LAM spring assembly 110, one or more brackets (drive end bracket assembly 115 and idle end bracket assembly 120), a fabric roll 125 and an optional hembar 130. FIG. 2 illustrates more detail of the LAM spring assembly 110. As set forth in FIG. 2, in various embodiments, the LAM spring assembly 110 may include a tube 205 (e.g., extruded aluminum), a decelerator plate 210, a spring 215, a tube plug 220, a shaft head 225, a magnet 230 and a pawl 235.

In general, a desired range of lift force to raise a window shade is used to select the window shade hardware such as, for example, the optimal LAM spring assembly 110. A desired lift force may be 5 pounds for ADA compliance. However, if the user wants to exert less effort to lift the window shade, the user may request an increased lift force of 6 or 7 pounds. Therefore, if a lift force range between 3-8.5 pounds is desired, the system selects the optimal LAM spring assembly 110 to maintain and guarantee that the lift force required to operate the shades will not exceed the desired range of between 3-8.5 pounds.

By using the desired lift force to select the optimal LAM spring assembly 110, there is an opportunity to control more than one shade band (e.g., multi-banded shade) so all the window bands lift simultaneously or close to the same level. For example, depending on the height of the shade band, the window shade system may include four 5-foot wide bands as a multi-band shade, wherein one drive bracket uniformly lifts all four shades. A coupler (e.g., dog bone connector) interconnects each shade band together. The coupler may be loosely coupled between bands to be forgiving to installation misalignments. The resulting working clearance between controlling surfaces on the coupler may cause the hem bar on each band to become slightly misaligned, stepping down from the drive band down to the idle band. Subsequent bands may have the same misalignment from the previous band, but the total misalignment from the first band to the last band is cumulative. Therefore, the further away the shade bands are from the drive mechanism, the greater likelihood that the hem bars for the shade bands tend to misalign. In various embodiments, the system may include a LAM spring assembly 110 installed within the farthest band from the drive band. Such a LAM spring assembly 110 installation may provide a counter-balancing force that may compensate or partially compensate for gravity to close-up the working clearances between coupled shade bands, thus reducing the hem bar misalignment across all bands.

Figure 3:
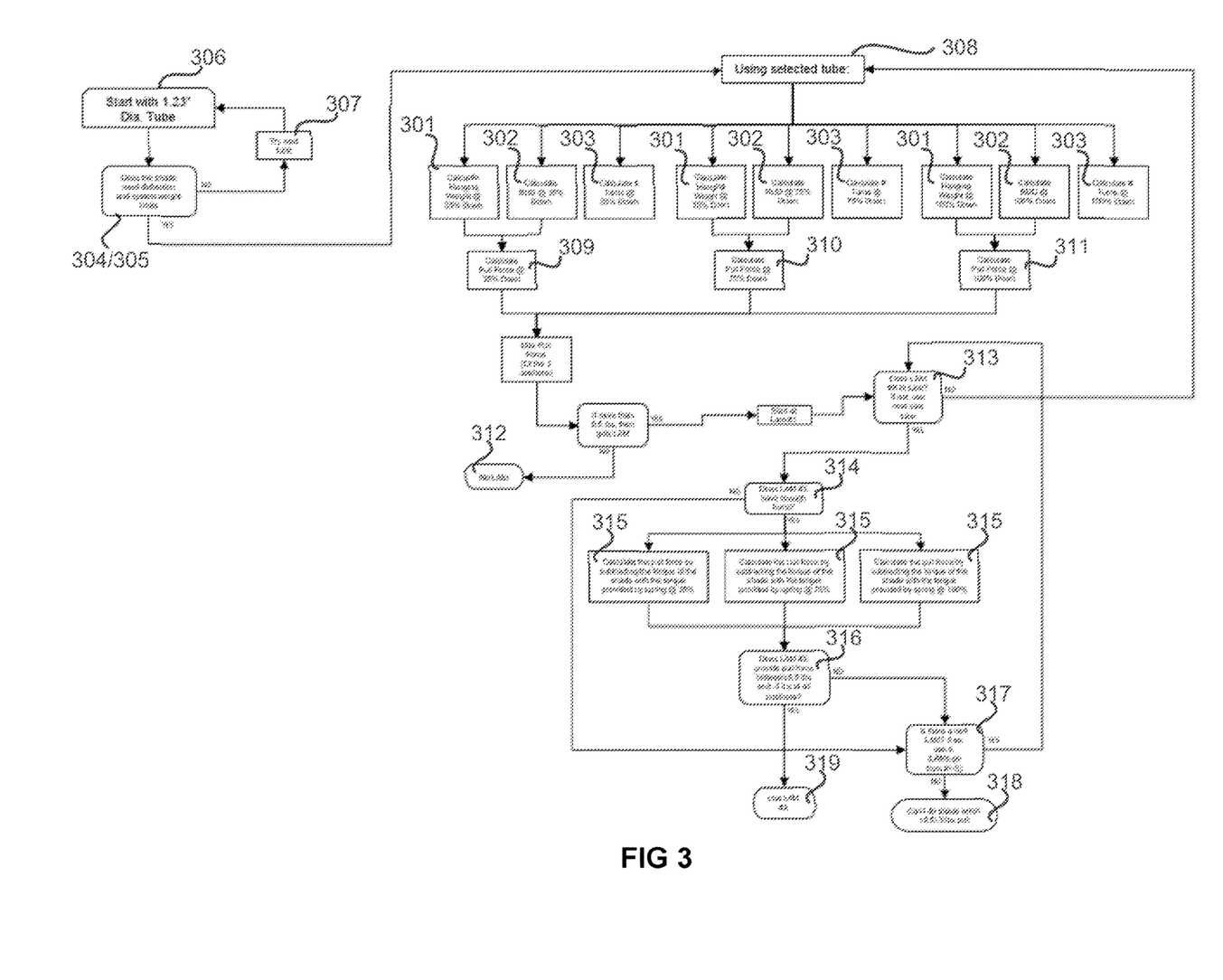
FIG. 3 is an exemplary flow chart of the process conducted by the configurator, in accordance with various embodiments.

Referring now to FIG. 3, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 3, but also to the various system components as described above with reference to FIG. 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, the configurator system may obtain physical measurements and/or mathematically model a window shade system (e.g., standard single-banded wrap clutch system). The configurator system may also account for various physical characteristics of the window shade system.

In various embodiments, and as set forth in FIG. 3, the configurator system may determine the pull force for lifting the shade by performing a pull force calculation based on the amount of torque required to start rotating the shade tube to lift the shade. As set forth in FIG. 3, in various embodiments, the pull force may be based on using the weight 301 of the hanging shade band and the rolled-up diameter (RUD) 302 of the fabric at a certain height combined with the diameter of the tube to determine the amount of torque required to lift said shade band. The pull force may be calculated at different shade locations (e.g., 35% down 309, 75% down 310, 100% down 311, etc.). Additional torque is required to overcome the friction from the weight of the system on the idle end pin, friction from the weight of the system on the drive hub sitting on the supporting drive shaft, friction of the clutch and/or friction of the chain being dragged across the opening of the housing. The pull force is any force that, when applied at the diameter of the sprocket, yields a torque that is greater than the torque imposed by the hanging weight of the shade band in addition to the static friction of the weight of the system on bearing components. The configurator may also analyze shade size, shade fabric, tube size, number of turns 303, multi-banding option, fabric weight, hembar weight, channel and/or other configurations.

In various embodiments, the process for developing the configurator system may include obtaining empirical data based on testing physical systems. The data may be normalized, processed, and then a best-fit equation developed (with margin) to fit the operational characteristics. The empirical data may be used to validate the pull force calculations set forth above. In certain shade systems, the empirically derived formula may account for unforeseen factors and be more accurate. In those cases, the empirically derived formula may be used in lieu of the mathematically derived formula.

The selection process includes analyzing a weight limit 304 for the shade. If the weight limit 304 is greater than allowable, then such a shade needs to use another system that is within the weight limits. If the shade is an allowable weight, then the system uses smallest tube size 306 available (e.g., 1.23 inch diameter tube) and checks the shade for the maximum deflection 305. In various embodiments, and as set forth in FIG. 3, the process for a configurator system considers the optimal deflection for tube selection. For example, the process may analyze a shade tube (e.g., 1.23 inch diameter) and analyze if the window shade tube meets or exceeds certain desired deflection limits and/or system weight limits (e.g., based on preferences). The deflection limits 305 and system weight limits 304 may be established and standardized based on the width of the shade and type of fabric. For example, a deflection and/or system weight that causes the window shade fabric to wrinkle may be unacceptable. The wrinkling of the fabric may be further impacted by the shade width or type of fabric. Therefore, if the window shade does not meet the desired deflection and/or system weight, then a different size tube (e.g., larger diameter tube) 307 is analyzed. If the deflection exceeds the pre-determined allowable limit, the next available larger size tube 307 is chosen for the same calculation. Subsequent tubes are chosen until an appropriate tube 308 is found. If no tube can satisfy the deflection limit, then the shade may not be possible using the tubes available for the current system.

After the tube has been selected, in various embodiments, the system determines the force for lifting the shade (as set forth FIG. 3 and as discussed above) at a variety of discrete locations 309, 310, 311 along the entire height of the shade system. If the lift force at any of the discrete locations 309, 310, 311 along the entire height of the shade is less than the pre-determined acceptable limit for pull force without a spring, a spring is not used 312. If the lift force is greater than the pre-determined acceptable limit for pull force without a spring, then another calculation is performed using the weakest available spring in the system.

Continuing with FIG. 3, the spring is checked to determine if it fits inside the current shade tube 313. If it does not, a larger shade tube is chosen for the next calculation. If the spring fits in the current shade tube, then the spring is used for the next calculation. The maximum number of turns that the spring is capable of is compared against the number of turns required to fully roll up the shade with its appropriate shade tube 314. If the maximum number of turns is exceeded, the next spring is chosen, otherwise the current spring and tube is used for the next calculation. This calculation calculates the torque that the spring provides at various discrete heights of the shade based on the number of the turns required at this shade height and the amount of torque per turn that the spring provides 315. The amount of torque provided by the spring subtracted by the amount of torque require to lift the shade (as set forth in FIG. 3 and as described above) is used to calculate the pull force. If the pull force calculated is between a certain value (−3 and 8 lbs in this case) at every discrete height calculated 316, then the shade is possible using the currently chosen spring and tube combination 319. If the pull force is outside of these values at any of the discrete heights, the next spring is chosen 317 and the steps above may be repeated. If there is no stronger spring, then the system may not be able to be configured 318.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

This disclosure incorporates by reference for all purposes the entire contents of all of the following applications. U.S. Ser. No. 15/968,564 filed on May 1, 2018 and entitled "Window Shade System Safety Device". U.S. Ser. No. 16/240,479 which is a continuation-in-part of U.S. Ser. No. 15/906,674 filed on Feb. 27, 2018 and entitled "Sky Camera System for Intelligent Building Control". U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control." U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." U.S. Ser. No. 14/692,868 is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System".

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like.

Terms and phrases similar to "associate" and/or "associating" may include tagging, flagging, correlating, using a look-up table or any other method or system for indicating or creating a relationship between elements. Any of the information may be distributed and/or accessed via a software enabled link, wherein the link may be sent via an email, text, post, social network input, and/or any other method known in the art.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server, any other application server components or may reside within another computing device or may take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of transactions over time, from web registrations, from social media, from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on status. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system or device in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form. For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   selecting an optimal lift assist mechanism (LAM) based on a desired range having a minimum amount of lift force for operating a window shade to avoid excessive momentum on the window shade and a maximum amount of lift force for applying to operate the window shade; and
   incorporating the LAM into a window shade system.

2. The method of claim 1, wherein the desired range further includes a predetermined amount of lift force by the LAM that results in the minimum amount of lift force to operate the window shade.

3. The method of claim 1, wherein the desired range further includes a predetermined amount of lift force by the LAM that results in the maximum amount of force.

4. The method of claim 1, wherein a threshold of the lift force is 9.6 pounds.

5. A method comprising selecting an optimal lift assist mechanism (LAM) based on a desired range of lift force, wherein the selecting the optimal LAM comprises:
   determining, by the processor, pull forces for the window shade at multiple locations based on a hanging weight, a RUD and a number of turns for the window shade at the multiple locations;
   selecting, by the processor, a first LAM based on at least one of a maximum pull force of the pull forces at the multiple locations being greater than a pull threshold, compatibility with a first shade tube, a number of turns being above a turn threshold for the window shade at the multiple locations, pull forces being within a pull force range at the multiple locations, or the first shade tube being below a deflection limit and a weight limit; and
   suggesting, by the processor, the first LAM for use with the window shade.

6. The method of claim 5, further comprising analyzing, by the processor, at least one of a shade size, shade fabric, size of the first shade tube, multi-banding option, fabric weight, hembar weight, channel or configuration for a window shading system.

7. The method of claim 5, further comprising substituting, by the processor, a second shade tube for the first shade tube, in response to the window shade with the first shade tube being above a deflection limit and a weight limit.

8. The method of claim 5, wherein the selecting the first LAM is based on the maximum pull force of the pull forces at the multiple locations being greater than the pull threshold, compatibility with the first shade tube, the number of turns being above the turn threshold for the window shade at the multiple locations, the pull forces being within the pull force range at the multiple locations and the first shade tube being below the deflection limit and the weight limit.

9. The method of claim 5, wherein the multiple locations include 35% down, 75% down and 100% down.

10. The method of claim 5, wherein the lift force threshold is 9.6 pounds.

11. The method of claim 5, further comprising suggesting, by the processor, no LAM in response to the maximum pull force being less than the pull threshold.

12. The method of claim 5, wherein being compatible with the first shade tube includes the first LAM fitting inside the first shade tube.

13. The method of claim 5, further comprising selecting, by the processor, a second shade tube, in response to the first LAM not being compatible with the first shade tube.

14. The method of claim 5, further comprising determining, by the processor, a second maximum pull force for a second shade tube, in response to the first LAM not being compatible with the first shade tube.

15. The method of claim 5, wherein the determining the pull forces for the first LAM includes subtracting the torque of the spring at the multiple locations to find the worst case from the torque of the window shade.

16. The method of claim 5, wherein the determining the pull force for the first LAM includes analyzing the RUD and the number of turns.

17. The method of claim 5, wherein the determining the pull force for the first LAM includes the RUD and the number of turns at a 75% down and a 100% down locations of the multiple locations.

18. The method of claim 5, wherein the pull force range is between about 8.6 pounds and about −5.5 pounds.

19. The method of claim 5, further comprising suggesting, by the processor, a second LAM, in response to the determining that the pull forces for the first LAM are outside of a pull force range at any of the multiple locations.

20. A system comprising:
   a processor; and
   a tangible, non-transitory memory configured to communicate with the processor, the tangible, non-transitory memory having instructions stored thereon that, in response to execution by the processor, cause the processor to perform operations comprising:
   determining, by the processor, pull forces for the window shade at multiple locations based on a hanging weight, a RUD and a number of turns for the window shade at the multiple locations;
   selecting, by the processor, a first LAM based on at least one of a maximum pull force of the pull forces at the multiple locations being greater than a pull threshold, compatibility with a first shade tube, a number of turns being above a turn threshold for the window shade at the multiple locations, pull forces being within a pull force range at the multiple locations, or the first shade tube being below a deflection limit and a weight limit; and
   suggesting, by the processor, the first LAM for use with the window shade.

* * * * *